US012722509B2

(12) United States Patent
Rosenberg

(10) Patent No.: US 12,722,509 B2
(45) Date of Patent: Sep. 1, 2026

(54) ELECTRIC VEHICLE WITH FAST CHARGING SYSTEM

(71) Applicant: Morgan D. Rosenberg, Alexandria, VA (US)

(72) Inventor: Morgan D. Rosenberg, Alexandria, VA (US)

( * ) Notice: Subject to any disclaimer, the term of this patent is extended or adjusted under 35 U.S.C. 154(b) by 653 days.

(21) Appl. No.: 18/218,041

(22) Filed: Jul. 4, 2023

(65) Prior Publication Data

US 2025/0010738 A1 Jan. 9, 2025

(51) Int. Cl.
*B60L 53/20* (2019.01)

(52) U.S. Cl.
CPC ........... *B60L 53/20* (2019.02); *B60L 2210/12* (2013.01); *B60L 2210/14* (2013.01); *B60L 2210/30* (2013.01)

(58) Field of Classification Search
CPC ..... H02J 7/70; H02J 7/50; B60L 53/62; B60L 53/80; B60L 53/30
USPC .......................................................... 320/107
See application file for complete search history.

(56) References Cited

U.S. PATENT DOCUMENTS 6,265,851 B1 7/2001 Brien et al.
11,433,774 B2 9/2022 Lee et al.
11,949,278 B1 * 4/2024 Eden .................. H01M 10/486
2011/0050167 A1 * 3/2011 Kissel, Jr. ............... B60L 53/36 361/111
2012/0056600 A1 * 3/2012 Nevin ..................... B60L 53/14 320/167
2022/0153150 A1 5/2022 Cook
2023/0216323 A1 * 7/2023 Cronin ...................... H02J 7/92 320/166
2023/0226933 A1 * 7/2023 Liu ......................... B60L 53/18 320/127
2025/0385539 A1 * 12/2025 Lee .......................... H02J 7/02

FOREIGN PATENT DOCUMENTS

WO 2022140501 A1 6/2022

OTHER PUBLICATIONS

Manjare, Aniket A., et al. "Regenerative Model for Electric Vehicle Application." 2019 International Conference on Communication and Electronics Systems (ICCES). IEEE, 2019.

* cited by examiner

*Primary Examiner* — Daniel A Hess

(57) ABSTRACT

The electric vehicle with a fast charging system uses at least one onboard capacitor to charge the battery of the electric vehicle. The electric vehicle includes at least one capacitor, such as a supercapacitor or the like, in electrical communication with the electric vehicle's battery for supplying charging current thereto. The at least one capacitor is disposed onboard the electric vehicle, and is in electrical communication with the charging port of the electric vehicle for receiving charging current to charge the at least one capacitor. When the charging port is connected to an external power supply, the at least one capacitor is charged rather than the battery. Once the at least one capacitor is charged, the charging port can be disconnected from the external power supply and the vehicle can begin driving. While driving, the at least one capacitor can charge the battery.

10 Claims, 5 Drawing Sheets

ELECTRIC VEHICLE WITH FAST CHARGING SYSTEM

BACKGROUND OF THE INVENTION

Field of the Invention

The disclosure of the present patent application relates to motor vehicles, and particularly to an electric vehicle with an onboard, capacitor-based charger for charging the electric vehicle's battery.

Description of Related Art

FIGS. 2A and 2B illustrate a typical electric vehicle 100 with a conventional charging system. Vehicle 100 includes at least one electric motor 212 to drive at least two wheels of vehicle 100 (e.g., electric motor 212 may drive the front pair of wheels or the rear pair of wheels). The power required for driving the motor 212 is stored in a high voltage battery 102, such as a lithium-based rechargeable battery or the like. The electric vehicle 100 is provided with a charging port 104, and the high voltage battery 102 may be charged by connecting the charging connector 152 of an external slow charger 150 to the charging port 104. Alternatively, as shown in FIG. 2B, the high voltage battery 102 may also be charged using an external quick charger 250, as will be discussed in greater detail below. In a typical electric vehicle, the high voltage battery 102 has a charging voltage between 350 V and 850 V. The slow charger 150 supplies commercial AC power which is then converted to DC current with a predetermined voltage inside electric vehicle 100. In contrast, the quick charger 250 receives an external DC voltage of typically 400 V to 800 V to directly charge the high voltage battery 102 without a separate DC conversion process. The quick charging system essentially moves the power conversion from inside the vehicle to the external charging system. Within electric vehicle 100 is an onboard charger (OBC) 202, which charges the high voltage battery 102 by converting commercial AC power supplied from the slow charger 150 into a DC voltage of approximately 800 V. Quick charger 250 includes, or is coupled with, a system similar to OBC 202 (but external to the vehicle), allowing the AC-DC conversion (if necessary) to occur external to the vehicle 100 (i.e., on the charging side).

As shown in FIG. 2B, an inverter 206 converts the power of the high voltage battery 102 to have the electrical characteristics required by the motor 212. The motor 212 generates a driving force under the power delivered through the inverter 206. As shown, the motor 212 and the inverter 206 can be used to charge the high voltage battery 102 together with the onboard charger 202, as needed.

FIG. 2C illustrates how the onboard charger 202 is connected to the high voltage battery 102, the inverter 206, and the motor 212. The onboard charger 202 includes an input 322, a boost power factor corrector 314, and a quick charger connector 316. An external commercial AC power supply (e.g., commercial AC power from the slow charger 150) is input to the input 322. The input 322 has five input lines L1, L2, L3, N and G; an electromagnetic interference (EMI) filter 312; and switches SW A, SW B, SW C, SW D, SW E, and SW F.

The EMI filter 312 is provided to remove noise included in the input commercial AC power. The EMI filter 312 has the five input lines L1, L2, L3, N and G connected thereto. Commercial AC power is input from the external commercial AC power supply to the EMI filter 312 through input lines L1, L2, L3, N and G: L1, L2, and L3 are AC power input lines, N is a neutral line, and G is a ground line. AC power up to three phases may be input to the EMI filter 312 through the AC power input lines L1, L2 and L3 among the input lines L1, L2, L3, N and G; i.e., three-phase AC power may be input to the EMI filter 312 through all of the AC power input lines L1, L2 and L3. Alternatively, two-phase AC power may be input to the EMI filter 312 through only the AC power input lines L1 and L2. As a further alternative, single-phase AC power may be input to the EMI filter 312 through only the AC power input line L1 and the neutral line N.

The switch SW A of the input 322 connects one of the AC power input line L2 and the neutral line N to the EMI filter 312. When the input commercial AC power is three-phase or two-phase, the switch SW A is controlled such that the AC power input line L2 is connected to the EMI filter 312. If the input commercial AC power is single phase, the switch SW A is controlled such that the neutral line N is connected to the EMI filter 312. Another switch SW B, SW C, SW D, SW E, SW F of the input 322 connects the EMI filter 312 and the boost power factor corrector 314 of the rear stage. The switch SW B, SW C, SW D, SW E, SW F will be described in more detail below with regard to the boost power factor corrector 314.

The boost power factor corrector 314 includes a first full bridge circuit composed of switching elements Q1, Q2, Q3 and Q4, and a second full bridge circuit composed of switching elements Q5, Q6, Q7 and Q8. The first to fourth legs 342, 344, 346 and 348 formed between Q1 and Q3, Q2 and Q4, Q5 and Q7, and Q6 and Q8, respectively, are connected to the EMI filter 312. Each of the first to fourth legs 342, 344, 346 and 348 may include an inductor component, as shown. The first full bridge circuit and the second full bridge circuit are connected in parallel to each other between the EMI filter 312 and a capacitor C1.

In the first full bridge circuit, leg 342 is connected to the AC power input line L1 via the EMI filter 312. Leg 344 is connected to the AC power input line L2 and the neutral line N through the EMI filter 312. Switch SW A determines which of the AC power input line L2 and the neutral line N is connected to leg 344. The AC power input line L2 is connected to leg 344 when the switch SW A is turned off, and the neutral line N is connected to leg 344 when the switch SW A is turned on.

In the second full bridge circuit, leg 346 is connected to the AC power input line L1 through EMI filter 312 at turn-on of the switch SW B, and the AC power input line L3 is connected through EMI filter 312 when the switch SW D is turned on. The other leg 348 is connected to the AC power input line L2 and the neutral line N through EMI filter 312 when the switch SW C is turned on. Accordingly, when the switch SW B is turned on, leg 346 is connected to the AC power input line L1, and when the switch SW D is turned on, leg 346 is connected to the AC power input line L3. Additionally, when the switch SW C is turned on, the AC power input line L2 and the neutral line N are connected to leg 348 through EMI filter 312. Switch SW A determines which of the AC power input line L2 and the neutral line N is connected to leg 348. The AC power input line L2 is connected to leg 348 when the switch SW A is turned off, and the neutral line N is connected to leg 348 when the switch SW A is turned on. Further, leg 346 is connected to the rear end of a switch SW G through switch SW E, and leg 348 is connected to the rear end of switch SW G through switch SW F. Thus, when both switch SW B and switch SW E are turned on, the AC power input line L1 is connected to the rear end of switch SW G. Additionally, when both switch SW C and switch SW F are turned on, one of the AC power input line L2 and the neutral line N is connected to the rear end of switch SW G.

The boost power factor corrector 314 is provided with capacitor C1, which is a power factor correction (PFC) link capacitor. Capacitor C1 is connected in parallel with both ends of the first full bridge circuit and both ends of the second full bridge circuit. The boost power factor corrector 314 is further provided with switch SW G and switch SW H. The switches SW G and SW H are connected to the positive electrode and the negative electrode of the capacitor C1, respectively. The positive electrode of the capacitor C1 is connected to the neutral point of motor 212 through switch SW G and switch SW 2. The negative electrode of the capacitor C1 is connected to the neutral point of motor 212 through switch SW H, a capacitor C2, and switch SW 2.

The positive electrode of the quick charger 250 is connected to the positive electrode of the high voltage battery 102 through switch SW 1 of the quick charger connector 316. The negative electrode of the quick charger 250 is connected to the negative electrode of the high voltage battery 102 through switch SW 3 of the quick charger connector 316. Additionally, the positive electrode and the negative electrode of the quick charger 250 are connected to the bottom switching elements QF, QE and QD of the inverter 206. Switch SW 2 is connected between the boost power factor corrector 314 and the motor 212, and switch SW 5 is connected between switch SW G of the boost power factor corrector 314 and the inverter 206. Switch SW 4 is connected between the inverter 206 and the positive electrode of the high voltage battery 102.

The inverter 206 includes six switching elements QA, QB, QC, QD, QE and QF. The current generated by the switching element QC and QF, the current generated by the switching element QB and QE, and the current generated by the switching element QA and QD are applied to each three-phase coils of the motor 212, respectively. The plurality of switches SW A, SW B, SW C, SW D, SW E, SW F, SW G, SW 1, SW 2 and SW 3; the plurality of switching elements Q1, Q2, Q3, Q4, Q5, Q6, Q7 and Q8; and the plurality of switches QA, QB, QC, QD, QE and QF are controlled by a controller 210 (shown in FIG. 2B), which delivers signals to each to either turn on or off. An example of such a conventional charging system is shown in U.S. Pat. No. 11,433,774 B2, which is hereby incorporated by reference.

The use of slow charger 150 is typically referred to as “Level 1” or “Level 2” charging. Both levels involve plugging an AC connector into the electric vehicle for conversion into DC current in OBC 202. The only difference between Level 1 and Level 2 is that Level 1 is typically 120 VAC and Level 2 is typically 240 VAC. Using Level 1 charging only typically adds about three to six miles of range to the vehicle per hour of charging. Level 2 charging typically adds about 20 to 30 miles or more of driving range per hour. A Level 2 system can typically fully charge the vehicle’s battery overnight. The use of quick charger 250 (often referred to as “DC fast charging”) can charge a battery to about 80% of capacity within 20 to 40 minutes. Despite the much faster charging speed when using quick charger 250, taking 20 to 40 minutes to only charge the battery up to 80% takes a great deal of time when compared against the few minutes required to fully fill the gas tank of a conventional vehicle with an internal combustion engine. It would obviously be desirable to be able to charge the battery of an electric vehicle in a similar time frame. Thus, an electric vehicle with a fast charging system solving the aforementioned problems is desired.

SUMMARY OF THE INVENTION

The electric vehicle with a fast charging system uses at least one onboard capacitor to charge the battery of the electric vehicle. The electric vehicle includes a motor for driving at least one wheel of the electric vehicle and a battery in electrical communication with the motor for providing electrical power thereto, as is conventionally known. At least one capacitor, such as a supercapacitor or the like, is in selective electrical communication with the battery for supplying charging current thereto. The at least one capacitor is disposed onboard the electric vehicle and is in electrical communication with the charging port of the electric vehicle for receiving charging current to charge the at least one capacitor.

In a conventional electric vehicle charging system, when the charging port is connected to an external power supply, the battery is charged relatively directly from the external power supply. In the electric vehicle with a fast charging system, the at least one capacitor is charged by the external power supply rather than the battery. Once the at least one capacitor is charged, the charging port can be disconnected from the external power supply and the vehicle can begin driving. While driving, the at least one capacitor can charge the battery, thus allowing charging of the battery to occur while the electric vehicle is in motion and no longer parked at the charging station or the like. In a conventional electric vehicle, charging the battery using an external power source requires the electric vehicle to be parked for 20 to 40 minutes. A supercapacitor, in contrast, only takes between 1 and 10 seconds to fully charge. Thus, the electric vehicle with the fast charging system is only required to be parked for between 1 and 10 seconds before resuming driving. The charging of the battery from the at least one capacitor can take place, either partially or fully, while the electric vehicle is driving.

As is conventionally known, an inverter may be in electrical communication with and between the motor and the battery. Additionally, when the charging port is connected to a slow charger, for example, an onboard charger may be in electrical communication with and between the charging port and the at least one capacitor for converting AC charging current to DC charging current. Alternatively, when a quick charger (i.e., an external DC fast charger) is employed, the charging port may be connected directly to the at least one capacitor. Further, in order to adjust the output voltage of the at least one capacitor to meet the requirements of the battery, a buck-boost converter may be in electrical communication with and between the at least one capacitor and the battery.

An onboard controller may be configured to selectively discharge the at least one capacitor to charge the battery. The onboard controller may be further configured to at least partially charge the battery from the at least one capacitor while the electric vehicle is in motion. The controller may be in communication with any suitable type of sensors, monitors, detectors or the like in order to determine that the electric vehicle has resumed driving. Alternatively, the controller may be in communication with the main controller(s) or computer(s) of the electric vehicle to determine the driving, parked, charging, etc. state(s) of the electric vehicle.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
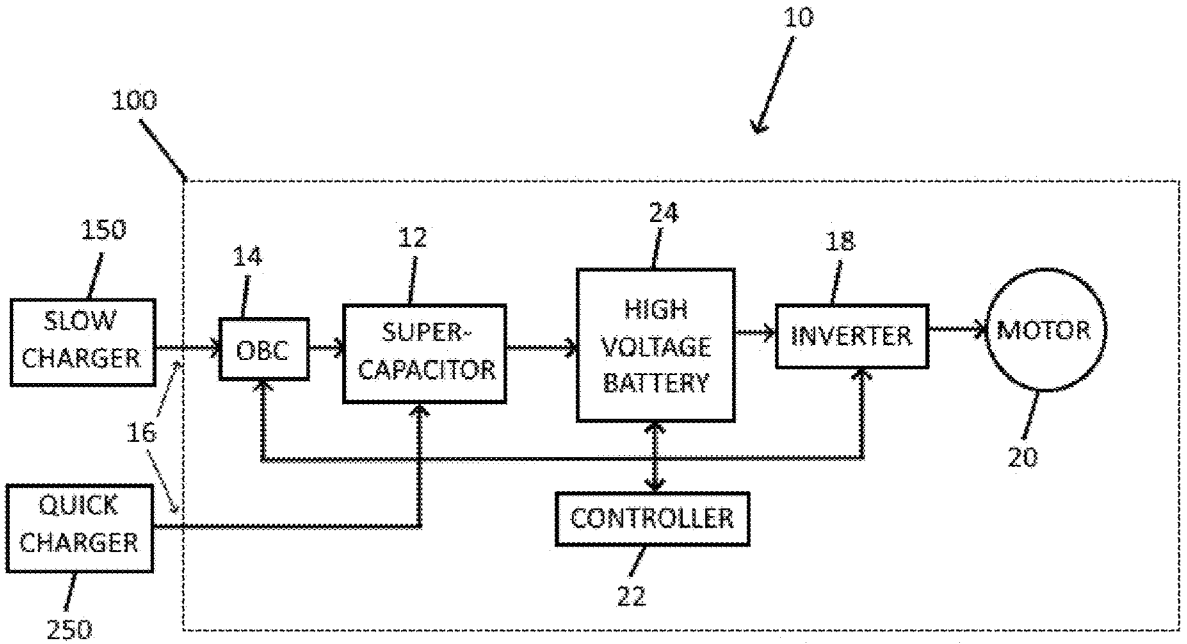
FIG. 1 is a block diagram illustrating system components of an electric vehicle with a fast charging system.
Figure 2A:
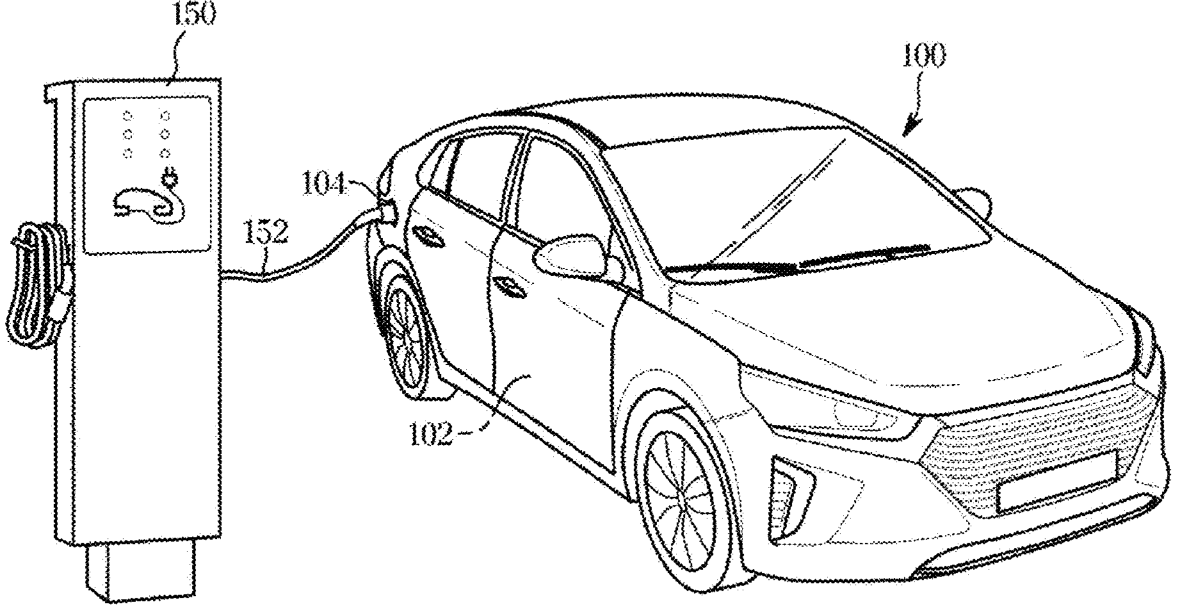
FIG. 2A illustrates charging of a conventional electric vehicle at a conventional charging station.
Figure 2B:
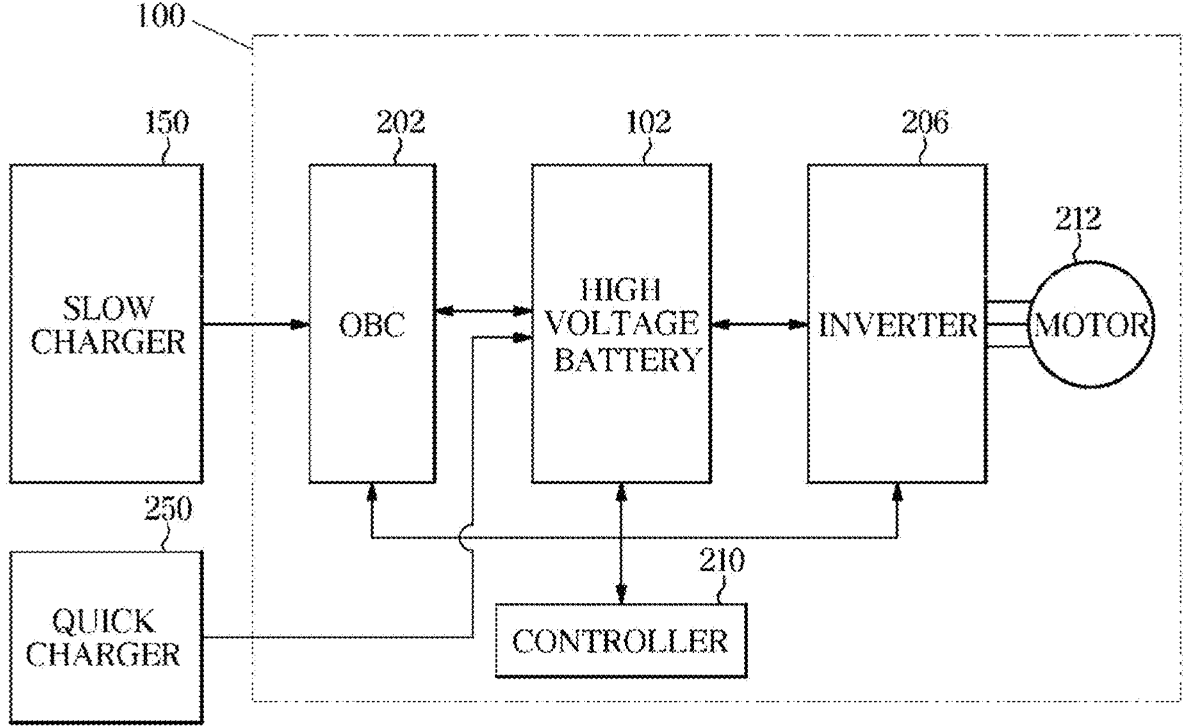
FIG. 2B is a block diagram illustrating system components of the conventional electric vehicle of FIG. 2A.
Figure 2C:
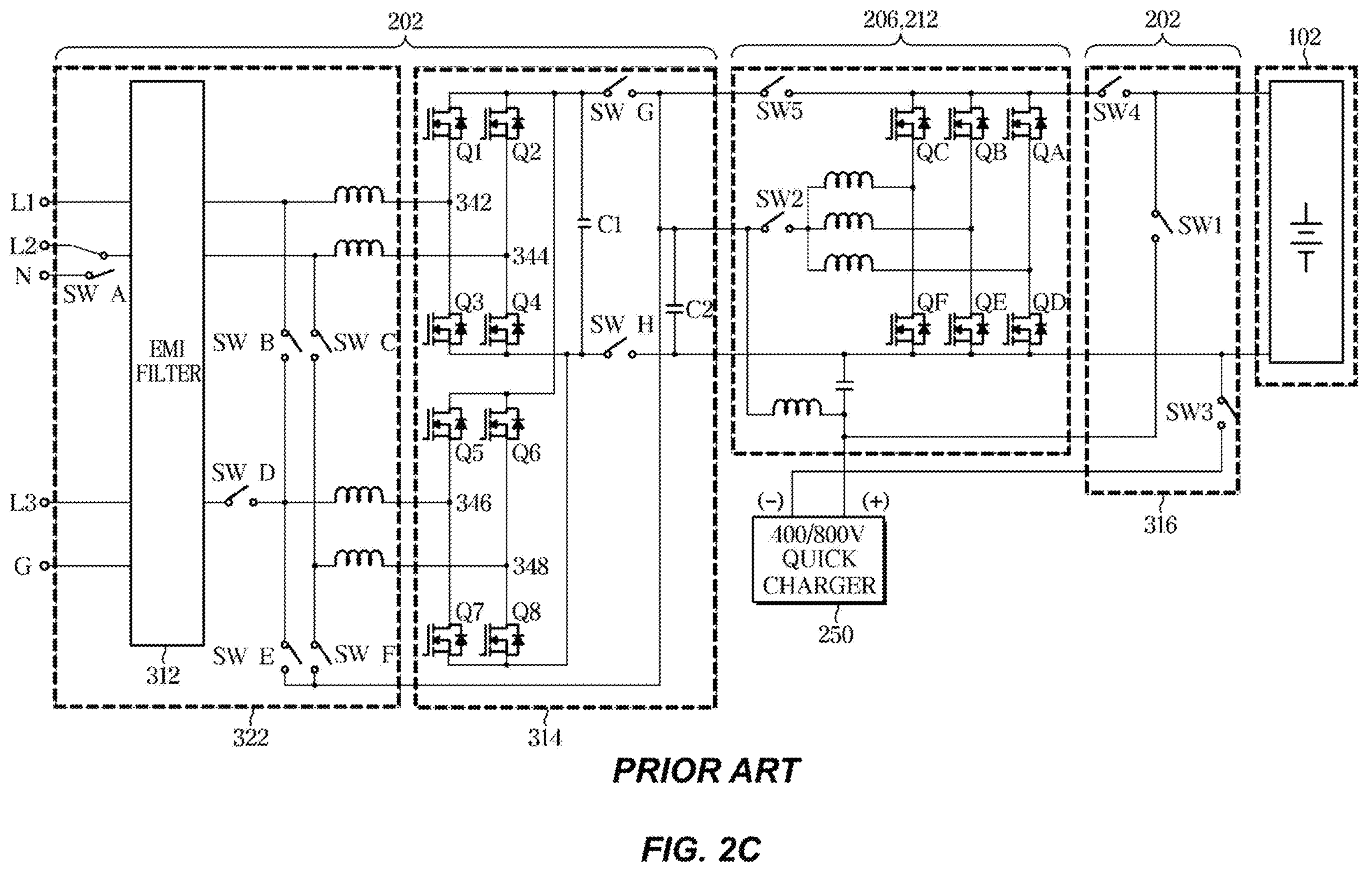
FIG. 2C is a schematic diagram of an onboard charger and inverter of the conventional electric vehicle of FIGS. 2A and 2B.

Referring now to FIG. 1, the electric vehicle with a fast charging system 10 uses at least one capacitor 12 to charge the battery 24 of the electric vehicle 100. It should be understood that the electric vehicle 100 may be any suitable type of electric vehicle, such as that described above with regard to FIGS. 2A-2C. Alternatively, the electric vehicle 100 may be a hybrid electric vehicle. The electric vehicle 100 includes at least a motor 20 for driving at least one wheel of the electric vehicle 100, and a battery 24 in electrical communication with the motor 20 for providing electrical power thereto, as is conventionally known. As is conventionally known, an inverter 18 may be in electrical communication with and between the motor 20 and the battery 24. It should be understood that battery 24, inverter 18 and motor 20 may be similar to battery 102, inverter 206 and motor 212 discussed above with regard to FIGS. 2A-2C, and may also be any suitable type of battery, inverter and motor, respectively, as are well known in the field of electric vehicles. Inverter 18 may be under the control of controller 22, similar to controller 210 discussed above with regard to FIGS. 2A-2C.

At least one capacitor 12 is in electrical communication with the battery 24 for supplying charging current thereto. As a non-limiting example, the at least one capacitor 12 may be at least one supercapacitor. The at least one capacitor 12 is disposed onboard the electric vehicle 100 and is in electrical communication with the charging port 16 of the electric vehicle 100 for receiving charging current to charge the at least one capacitor 12. The charging port 16 may be similar to the charging port 104 discussed above with regard to FIGS. 2A-2C. It should, however, be understood that any suitable type of charging port may be used. In the non-limiting example of FIG. 1, the at least one capacitor 12 is shown as a supercapacitor, however, it should be understood that any suitable type of capacitor(s) may be used.

As is well known in the art, a supercapacitor (also referred to as an ultracapacitor) is a high-capacity capacitor, with a capacitance value much higher than other capacitors but with lower voltage limits. Supercapacitors bridge the gap between electrolytic capacitors and rechargeable batteries, typically storing 10 to 100 times more energy per unit volume or mass than electrolytic capacitors, accepting and delivering charge much faster than batteries, and tolerating many more charge and discharge cycles than rechargeable batteries. It should be understood that the at least one capacitor 12 may, as a non-limiting example, be any suitable type of supercapacitor, including, but not limited to, electrostatic double-layer capacitors (EDLCs), electrochemical pseudocapacitors, and hybrids thereof.

When the charging port 16 is connected to an external power supply, such as slow charger 150 or quick charger 250 (as described above with regard to FIGS. 2A-2C), the at least one capacitor 12 is charged rather than the battery 24. Once the at least one capacitor 12 is charged, the charging port 16 can be disconnected from the external power supply 150/250 and the electric vehicle 100 can begin driving. While driving, the at least one capacitor 12 can charge the battery 24.

In a conventional electric vehicle charging system, when the charging port 16 is connected to an external power supply, such as slow charger 150 or quick charger 250, the battery is charged relatively directly from the external power supply 150/250. In the electric vehicle with a fast charging system 10, the at least one capacitor 12 is charged by the external power supply 150/250 rather than battery 24. Once the at least one onboard capacitor 12 is charged, the charging port 16 can be disconnected from the external power supply 150/250 and the electric vehicle 100 can begin driving. While driving, the at least one capacitor 12 can charge the battery 24, thus allowing charging of the battery 24 to occur while the electric vehicle 100 is in motion and no longer parked at the charging station or the like. In a conventional electric vehicle, charging the battery using an external power source requires the electric vehicle to be parked for 20 to 40 minutes. A supercapacitor, in contrast, only takes between 1 and 10 seconds to fully charge. Thus, the electric vehicle with the fast charging system 10 is only required to be parked for between 1 and 10 seconds before resuming driving. The charging of the battery 24 from the at least one capacitor can take place, either partially or fully, while the electric vehicle 100 is driving.

Additionally, when the charging port 16 is connected to slow charger 150, which may be a 120 VAC or 240 VAC power supply, for example, an onboard charger 14 may be in electrical communication with and between the charging port 16 and the at least one capacitor 12 for converting AC charging current to DC charging current and/or for further modifying, filtering, managing and/or regulating the charging current. The onboard charger 14 may be similar to onboard charger 202 discussed above with regard to FIGS. 2A-2C, and it should be understood that any suitable type of onboard charger may be used. Alternatively, when a quick charger 250 (i.e., an external DC fast charger) is employed, the charging port 16 may be connected directly to the at least one capacitor 12 (or be connected through any necessary transformers, converters, rectifiers, filters or the like).

It should be understood that although onboard charger 14 may be similar to onboard charger 202, onboard charger 14 may be any suitable type of onboard charger for electric vehicle 100. As a non-limiting example, onboard charger 14 may be adapted for converting power from AC to DC (e.g., using an AC-to-DC converter, a rectifier or the like). In the particular non-limiting example of onboard charger 14 including a rectifier, the rectifier may be, or include, at least one silicon controlled rectifier (SCR), at least one insulated-gate bipolar transistor (IGBT) rectifier, any combination thereof or the like.

Additionally or alternatively, onboard charger 14 may be configured to convert power from a first potential (e.g., first voltage) to a second potential (e.g., second voltage). For example, the second potential (e.g., voltage) may be higher than the first potential (e.g., voltage). As a non-limiting example, the second potential may be selected (e.g., predetermined, preselected, dynamically selected or the like) based on the power requirements of the at least one capacitor 12 and/or battery 24. Additionally or alternatively, the second potential may be selected to meet and/or exceed a desired charging level of the at least one capacitor 12 and/or battery 24.

As further non-limiting examples, onboard charger 14 may include at least one transformer (e.g., a step-up transformer, a step-down transformer, any combination thereof or the like). Additionally or alternatively, onboard charger 14 may include at least one of a boost converter, a buck converter, a buck-boost converter, any combination thereof or the like. Additionally or alternatively, onboard charger 14 may include at least one of a filter (e.g., a radio frequency interference (RFI) filter or the like), a fuse, an inductor, any combination thereof or the like.

Figure 3:
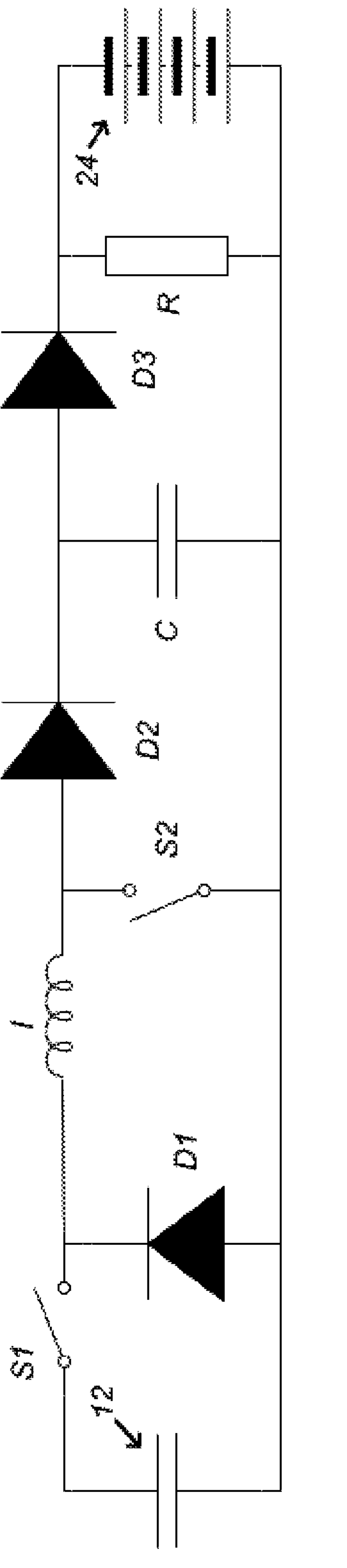
FIG. 3 is a schematic diagram of a buck-boost converter connecting at least one capacitor and a battery of the electric vehicle with a fast charging system.

As shown in FIG. 3, in order to adjust the output voltage of the at least one capacitor 12 to meet the requirements of the battery 24, a buck-boost converter may be in electrical communication with and between the at least one capacitor 12 and the battery 24. It should be understood that the particular arrangement shown in FIG. 3 is for exemplary purposes only and may be replaced by any suitable type of buck-boost converter or any other suitable type of DC-DC converter or the like. In FIG. 3, the at least one capacitor 12 and diode D1 replace the power source in a conventional buck-boost converter circuit, and the battery 24 at least partially serves as the load (and may be connected in parallel with at least one other load or resistor R, as shown). Electrical connection between the at least one capacitor 12 and battery 24 is controlled through closing and opening switch S1. As in a conventional buck-boost converter, when switch S2 is in the on state, the input voltage source (i.e., the at least one capacitor 12) is directly connected to the inductor I. This results in accumulating energy in inductor I. In this stage, the capacitor C supplies energy to the output load (i.e., the battery 24). While switch S2 is in the off state, the inductor I is connected to the battery 24 and capacitor C, so energy is transferred from inductor I to capacitor C and resistor R. Diodes D1, D2 and D3 serve to maintain the proper polarity, as in a conventional buck-boost converter. It should be understood that switches S1 and S2 may be any suitable type of switches, such as, but not limited to, metal-oxide-semiconductor field-effect transistor (MOSFET), insulated-gate bipolar transistor (IGBT) or bipolar junction transistor (BJT) switches.

In addition to the functions of controller 22 discussed above, particularly with regard to the similarity between controller 22 and controller 210, as non-limiting examples, controller 22 may be configured to control charging and discharging of the at least one capacitor 12, such as by controlling switch S1 and switch S2 of the buck-boost converter of FIG. 3. The onboard controller 22 may be configured to selectively discharge the at least one capacitor 12 to charge the battery 24, and it should be understood that the charging of battery 24 from the at least one capacitor 12, and the selective control thereover, may be accomplished using any suitable type of controller, control circuitry, power regulating circuitry, power transferring circuitry or the like. The onboard controller 22 may be further configured to at least partially charge the battery 24 from the at least one capacitor 12 while the electric vehicle 100 is in motion. It should be understood that the controller 22 may be in communication with any suitable type of sensors, monitors, detectors or the like in order to determine that the electric vehicle 100 has resumed driving. Alternatively, the controller 22 may be in communication with the main controller(s) or computer(s) of the electric vehicle 100 to determine the driving, parked, charging, etc. state(s) of the electric vehicle 100.

It should be understood that controller 22 may be any suitable type of controller capable of receiving information from, communicating information to, and/or controlling onboard charger 14, inverter 18, the at least one capacitor 12, and electrical components associated with battery 24. It should be understood that controller 22 may be implemented in hardware, software, firmware and/or any combination thereof. For example, controller 22 may include a computing device, such as a processor (e.g., a central processing unit (CPU), a graphics processing unit (GPU), an accelerated processing unit (APU) or the like), a microprocessor, a digital signal processor (DSP), a processing component (e.g., a field programmable gate array (FPGA), an application-specific integrated circuit (ASIC), a programmable logic controller (PLC) or the like), a group of computing devices, other like devices, any combination thereof or the like, which can be programmed to perform a function. It should be further understood that controller 22 may be in communication with a data storage device, which may be local or remote to controller 22, including any suitable type of computer readable memory.

The at least one capacitor 12 may be a single capacitor or an array of capacitors, such as an array of supercapacitors or the like. As a non-limiting example, a number of supercapacitors may be provided in modules (e.g., subsets) corresponding to a fixed unit of energy storage representing a maximum suggested energy storage amount of the supercapacitors in the module. As a further non-limiting example at least some of the supercapacitors (and/or modules thereof) may be connected in series; e.g., such that the combined (e.g., summed or the like) voltage of the series-connected supercapacitors satisfies (e.g., equals, exceeds or the like) the desired operating voltage of battery 24. Additionally or alternatively, at least some of the supercapacitors (and/or modules thereof) may be connected in parallel; e.g., such that the combined (e.g., summed or the like) current of the parallel-connected supercapacitors satisfies (e.g., equals, exceeds or the like) the desired charging current of the battery 24.

The capacitance of the at least one capacitor may be selected (e.g., predetermined, preselected, dynamically selected or the like) based on the power demands of battery 24. As a non-limiting example, the capacitance of the at least one supercapacitor 12, including an array of supercapacitors, may be between 13 F and 60 F. As a further non-limiting example, the capacitance of the at least one supercapacitor 12 may be selected to provide sufficient power to battery 24 for a selected period of time. For example, the capacitance of the at least one supercapacitor 12 may be selected to ensure that the at least one supercapacitor 12 can provide sufficient power for battery 24 to fully charge within a desired time period. Additionally or alternatively, the capacitance of the at least one supercapacitor 12 may be selected to ensure that the at least one supercapacitor 12 can provide sufficient power for battery 24 to charge enough to power the electric vehicle 100 to drive a selected distance.

The charge level of the at least one capacitor 12 may be maintained within a range that is either at full capacity or a desired level that is less than full capacity. As a non-limiting example, the charge of the at least one supercapacitor 12 may be maintained (e.g., by controller 22, onboard charger 14 or the like) within a range of over 120 V, over 240 V, over 480 V, over 600 V, 640-780 V, 755-764 V, or the like. As a further non-limiting example, if the charge (e.g., voltage) of the at least one supercapacitor 12 drops below a threshold, an alert may be generated (e.g., by controller 22) and/or communicated (e.g., from controller 22 to a user device). As a further non-limiting example, the charge of the at least one supercapacitor 12 may be maintained (e.g., by controller 22, onboard charger 14 or the like) with a voltage much higher than the charging voltage of battery 24, and/or the buck-boost converter of FIG. 3 may reduce the voltage of the power supplied from the at least one capacitor 12 to battery 24.

As an additional non-limiting example, the at least one capacitor 12 may include a discharge circuit. For example, the discharge circuit may be connected (e.g., electrically connected, coupled or the like) to the at least one capacitor 12 and/or may be configured to discharge energy from the at least one capacitor 12 (e.g., when powering down the at least one capacitor 12, for safety when a cabinet containing the at least one capacitor 12 is opened, when a failure is detected in the system or the like). As a further non-limiting example, the discharge circuit may include a resistor bank; e.g., configured to convert electrical energy into heat, light, any combination thereof or the like. Additionally or alternatively, the discharge circuit may be configured to completely discharge the at least one capacitor 12 in a predetermined period of time. As a further non-limiting example, the discharge circuit may be triggered by any powering down event; e.g., a detected error in battery 24, a detected tampering and/or security event, manual powering down, opening a cabinet containing the at least one capacitor 12 or the like.

It is to be understood that the electric vehicle with a fast charging system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. An electric vehicle with a fast charging system, comprising:

a motor for driving at least one wheel of the electric vehicle;

a battery in electrical communication with the motor for providing electrical power thereto;

at least one capacitor in selective electrical communication with the battery for supplying charging current thereto, wherein the at least one capacitor is disposed onboard the electric vehicle;

a charging port in electrical communication with the at least one capacitor for charging the at least one capacitor, wherein the charging port is configured for electrical connection with a power source external to the electric vehicle for charging the at least one capacitor with the power source;

a first switch;

a second switch;

an inductor;

a resistor;

a secondary capacitor; and first, second and third diodes, wherein the battery is connected in parallel with the resistor, the secondary capacitor and the first diode, wherein the first switch is connected between the at least one capacitor and the first diode, such that, when the first switch is closed, the at least one capacitor is connected in parallel with the resistor, the secondary capacitor and the first diode, wherein the third diode is connected between the secondary capacitor and the resistor, wherein the inductor and the second diode are connected in series between the first switch and the third diode, wherein, when the second switch is closed, the second switch is connected in parallel with the first diode, the secondary capacitor, the resistor and the battery, wherein, when the second switch is closed, the inductor is connected between the first diode and the second switch, and wherein, when the second switch is closed, the second diode is connected between the second switch and the secondary capacitor.

2. The electric vehicle with a fast charging system as recited in claim 1, wherein the at least one capacitor comprises at least one supercapacitor.

3. The electric vehicle with a fast charging system as recited in claim 1, further comprising an inverter in electrical communication with and between the motor and the battery.

4. The electric vehicle with a fast charging system as recited in claim 1, further comprising an onboard charger in electrical communication with and between the charging port and the at least one capacitor for converting AC charging current to DC charging current.

5. The electric vehicle with a fast charging system as recited in claim 1, further comprising a controller configured to selectively discharge the at least one capacitor to charge the battery.

6. The electric vehicle with a fast charging system as recited in claim 5, wherein the controller is further configured to at least partially charge the battery from the at least one capacitor while the electric vehicle is in motion.

7. A method of charging an electric vehicle, comprising the steps of:

charging at least one capacitor from a power source external to the electric vehicle, the at least one capacitor being disposed onboard the electric vehicle;

electrically connecting the at least one capacitor to a battery of the electric vehicle; and discharging the at least one capacitor to charge the battery from the at least one capacitor, wherein the step of electrically connecting the at least one capacitor to the battery comprises electrically connecting the at least one capacitor to the battery through a circuit, and wherein the circuit comprises a first switch, a second switch, an inductor, a resistor, a secondary capacitor and first, second and third diodes, wherein the battery is connected in parallel with the resistor, the secondary capacitor and the first diode, wherein the first switch is connected between the at least one capacitor and the first diode, such that, when the first switch is closed, the at least one capacitor is connected in parallel with the resistor, the secondary capacitor and the first diode, wherein the third diode is connected between the secondary capacitor and the resistor, wherein the inductor and the second diode are connected in series between the first switch and the third diode, wherein, when the second switch is closed, the second switch is connected in parallel with the first diode, the secondary capacitor, the resistor and the battery, wherein, when the second switch is closed, the inductor is connected between the first diode and the second switch, and wherein, when the second switch is closed, the second diode is connected between the second switch and the secondary capacitor.

8. The method of charging an electric vehicle as recited in claim 7, wherein the step of charging the at least one capacitor comprises charging at least one supercapacitor, wherein the at least one supercapacitor is disposed onboard the electric vehicle.

9. The method of charging an electric vehicle as recited in claim 7, further comprising the step of converting AC current from the power source to DC current, wherein the step of charging the at least one capacitor comprises charging the at least one capacitor with the DC current.

10. The method of charging an electric vehicle as recited in claim 7, wherein the step of discharging the at least one capacitor to charge the battery occurs at least partially while the electric vehicle is in motion.

* * * * *